(12) United States Patent
Schiller et al.

(10) Patent No.: US 9,463,671 B2
(45) Date of Patent: Oct. 11, 2016

(54) PNEUMATIC VEHICLE TIRE

(71) Applicant: Continental Reifen Deutschland GmbH, Hannover (DE)

(72) Inventors: Robert Schiller, Hannover (DE); Daniela Schirra, Hannover (DE); Kalyan Yalamanchili, Hannover (DE)

(73) Assignee: Continental Reifen Deutschland GmbH, Hannover (DE)

( * ) Notice: Subject to any disclaimer, the term of this patent is extended or adjusted under 35 U.S.C. 154(b) by 400 days.

(21) Appl. No.: 14/091,149

(22) Filed: Nov. 26, 2013

(65) Prior Publication Data

US 2014/0083584 A1 Mar. 27, 2014

Related U.S. Application Data

(63) Continuation of application No. PCT/EP2012/055928, filed on Apr. 2, 2012.

(30) Foreign Application Priority Data

May 26, 2011 (EP) ..................... 11167618

(51) Int. Cl.
*B60C 11/01* (2006.01)
*B60C 11/03* (2006.01)
*B60C 11/00* (2006.01)

(52) U.S. Cl.
CPC ............ *B60C 11/0083* (2013.04); *B60C 11/01* (2013.01); *B60C 2011/0355* (2013.04)

(58) Field of Classification Search
CPC ....... B60C 11/0083; B60C 3/00; B60C 3/04; B60C 11/01; B60C 2011/0355; B60C 2011/0367; B60C 2011/0379; B60C 11/04

USPC ............ 152/209.14, 209.15, 209.18, 209.25
See application file for complete search history.

(56) References Cited

U.S. PATENT DOCUMENTS

| 2,781,815 | A | | 2/1957 | Davis | |
|---|---|---|---|---|---|
| 5,109,902 | A | * | 5/1992 | Kobayashi | B60C 9/18 152/209.7 |
| 5,660,652 | A | | 8/1997 | Young et al. | |
| 5,803,999 | A | * | 9/1998 | Shibata | B60C 3/04 152/209.14 |
| 6,058,996 | A | * | 5/2000 | Suzuki | B60C 9/22 152/209.1 |

(Continued)

OTHER PUBLICATIONS

International Search Report dated May 11, 2012 of international application PCT/EP2012/055928 on which this application is based.

*Primary Examiner* — Eric Hug
(74) *Attorney, Agent, or Firm* — Walter Ottesen, P.A.

(57) ABSTRACT

A vehicle pneumatic tire has a two-layer belt and a tread having profile grooves within width TW 45. The maximum depth of the profile grooves varies within TW 45 and the tread has an outer contour defined by reference to rolling radius differences. The maximum depth of the grooves within a center region of TW 45 is the same. The maximum depth of the grooves in the shoulder region is a maximum of 2 mm less than in the center region. The outer contour of the tread in the center region is made flat so that the outer contour radius difference ($Ard_M$) between the zenith and the center region axial end is less than 1 mm, and the outer contour of the tread in the transition region is configured so that the outer contour radius difference ($Ard_S$) between the zenith and the transition is 3 mm to 5 mm.

4 Claims, 3 Drawing Sheets

(56) References Cited

U.S. PATENT DOCUMENTS 6,116,309 A 9/2000 Gillard et al.
8,272,414 B2 9/2012 Matsunaga et al.

2002/0153079 A1* 10/2002 Rayman ............... B60C 1/0016
152/538
2005/0076985 A1* 4/2005 Colombo ............ B60C 11/0302
152/209.18

* cited by examiner

PNEUMATIC VEHICLE TIRE

CROSS REFERENCE TO RELATED APPLICATIONS

This application is a continuation application of international patent application PCT/EP2012/055928, filed Apr. 2, 2012, designating the United States and claiming priority from European application 11167618.5, filed May 26, 2011, and the entire content of both applications is incorporated herein by reference.

FIELD OF THE INVENTION

The invention relates to a pneumatic vehicle tire of a radial configuration having an at least two-layer belt and a tread. The tread has tread grooves within the axial width of TW 45 for forming profile positives. The maximum depth of the tread grooves varies within the axial width of TW 45. The tread has an outer contour which is defined on the fitted and inflated tire on the basis of outer contour radius differences.

BACKGROUND OF THE INVENTION

Such pneumatic vehicle tires are sufficiently known to the person skilled in the art. These pneumatic vehicle tires mostly have a comparatively round tread outer contour and such groove depths which are smaller in the zenith of the tread than outside the zenith. The groove depth in the direction of rotation of a groove is normally identical.

The belt and in particular the belt edges have—as seen in the cross-section of the tire—a convex formation in the unloaded state of the tire. In the loaded state of the tire, the belt edges form a transition into an approximately convex formation by deformation radially upwards. This movement and deformation of the belt edges have disadvantageous effects on specific performance features of the tire such as on transverse rigidity, abrasion and rolling resistance. This is because the radially upper tread portion is also lifted radially upwards and in the direction of the tire zenith by the "lifting" of the belt edges during operation of the tire. The transverse rigidity and the rolling resistance of the tire are disadvantageously influenced as a result. The deformation described above of the belt and of the tread brings about shearing forces which lead to increased sliding movements in the ground contact area of the tread, as a result of which frictional forces arise which are responsible for increased wear of the tire.

The transverse rigidity is disadvantageously reduced by the deformation described above, and the rolling resistance and the wear of the tire are disadvantageously increased.

The performance features of transverse rigidity, rolling resistance and wear are conflicting objectives, wherein previously, in the case of improvement of the rolling resistance and the transverse rigidity, wear was made worse and vice versa.

SUMMARY OF THE INVENTION

It is an object of the invention to provide a tire of the above-mentioned type wherein the conflict between the objectives of transverse rigidity, rolling resistance and wear is resolved at a higher level.

The object is achieved according to the invention in that the maximum depth of the tread grooves within a center region of TW 45 is identical, that the maximum depth of the grooves in the shoulder region is a maximum of 2 mm less than in the center region; and, that the outer contour of the tread in the center region is configured to be flat such that the outer contour radius difference between the zenith and the axial end of the center region is less than 1 mm, and that the outer contour of the tread in the region of the transition to the shoulder region is configured in such a manner that the outer contour radius difference between the zenith and this transition to the shoulder region is between 3 mm and 5 mm.

The inventors have surprisingly ascertained that a specific outer contour of the tread in combination with a specific distribution of the maximum groove depths in the axial direction has a significant effect on the deformation of the belt and thus brings about an improvement in the performance features of abrasion, transverse rigidity and rolling resistance.

A pneumatic vehicle tire with an outer contour and groove distribution according to the invention has a significantly reduced deformation of the belt so that the conflict of objectives between transverse rigidity, rolling resistance and wear is resolved at a higher level.

The pneumatic vehicle tire according to the invention has a flat tread outer contour during operation in the center region and a rounded tread outer contour in the shoulder region. The grooves of maximum depth have a depth in the shoulder region which is at most 2 mm less than in the center region.

By definition, the tread has a center region and a shoulder region.

"TW 45" is the width of the tread between two points PTW, wherein each of these points PTW is the point of intersection of a tangent extending at 45° to the radial on the outside of the shoulder with a curve running in the extension of the outer contour of the tread.

"Center region" is a tread region which extends in the circumferential direction of the tire and which—as seen in the cross-section of the tire—occupies an axial extension of 40%-60% of TW 45 and is oriented symmetrically and centered in relation to the tire zenith.

"Shoulder region" is a tread region which extends in the circumferential direction of the tire and which—as seen in the cross-section of the tire—extends axially from 80% of TW 45 to 90% of TW 45 and is oriented symmetrically and centered in relation to the tire zenith.

"Outer contour radius" refers to the radial distance between a point on the outer contour and the wheel axle.

"Outer contour radius difference" refers to the radial distance between a point on the outer contour and the zenith.

The "rolling radius" is the radius which results from the rolling circumference of the tire mounted on the vehicle under wheel load and corresponding internal pressure in accordance with E.T.R.T.O. standards. The rolling radius difference thus emerges from the different rolling circumferences at the measurement points along the cross-section.

The "tire zenith" or "zenith" is—as seen in the tire cross-section—the point of intersection between the equator plane of the tire and the outer contour of the tread.

"Grooves of maximum depth" refers to those grooves, for example circumferential grooves or transverse grooves, which are configured to be the deepest. An envelope running parallel to the tread outer contour and radially internally touching the deepest groove(s) (of maximum depth) forms the so-called "lower contour path".

Tread groove depths are measured perpendicular to the tread outer contour.

The values contained in the descriptions for radius differences and other dimensions of the tire are related to a tire placed on a rim and under nominal pressure (according to E.T.R.T.O. standards). The mold data (dimensions from the vulcanization mold) generally have substantially corresponding dimensions.

According to one preferred embodiment of the invention, a belt layer is present which is preferably of a one-layer configuration. This leads to a significant improvement in rolling resistance.

It is advantageous if the belt is of a two-layer configuration, wherein the reinforcements of the two belt layers have a belt angle of less than 24°, measured in the tire zenith. Such a configuration minimizes the rolling radius differences or the outer contour radius differences and leads to less slip in the ground contact area of the tire.

In the case of one preferred embodiment variant of the invention, the outer contour radius difference between the zenith and the axial end of the center region is approximately 0.3 mm. A particularly flat outer contour in the center region is created which particularly advantageously only causes a small deformation of the belt edges.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
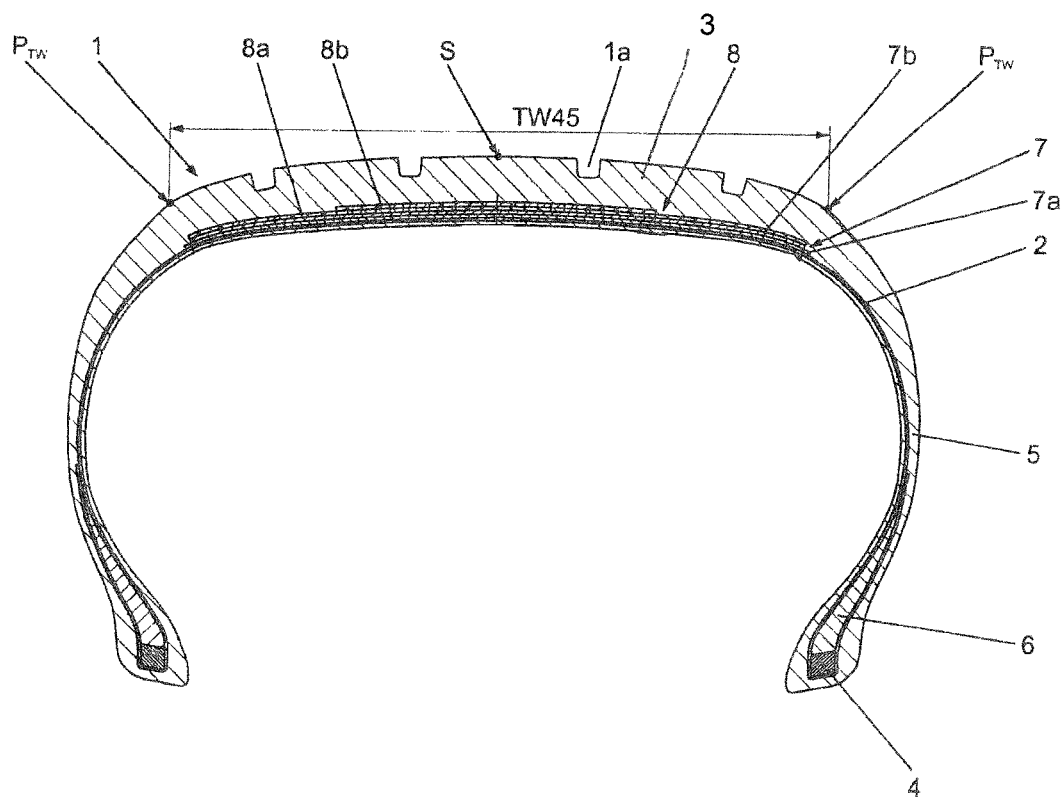
FIG. 1 shows a cross-section through a pneumatic vehicle tire for cars according to the prior art.

The cross-section of a pneumatic vehicle tire shown schematically in FIG. 1 is a car tire of the prior art with a tread 1, a carcass 2 which, in bead regions, extends around bead cores 4 and ends in the region of side walls 5, with core profiles 6 radially outside bead cores 4 and a belt assembly 7 including two belt plies (7a, 7b) and a binding band 8 made of two binding band layers (8a, 8b).

Tread 1 is provided with a profiling of which peripheral grooves 1a are represented by way of example in FIG. 1. The tread grooves which form the profiling are arranged within the axial width of TW 45 for the formation of profile positives 3. The maximum depth of grooves 1a varies within the axial width of TW 45. The tread has an outer contour defined on the mounted and inflated tire on the basis of outer contour radial differences.

Both belt plies (7a, 7b) are located between tread 1 and carcass 2, wherein belt ply 7a located radially further to the inside is the wider of the two belt plies (7a, 7b). Both belt plies (7a, 7b) can have a conventional structure and include reinforcement, in particular steel cords, embedded into a rubber mixture and running in each ply parallel to one another. The mutual arrangement of the steel cords in both belt plies (7a, 7b) is carried out in such a manner that the steel cords running in one ply cross over those which run in the second belt ply, wherein the steel cords, in each of belt plies (7a, 7b), define a specific angle, the so-called belt angle, with the circumferential direction.

Binding band 8 includes a radially inner binding band layer 8a, which covers entire belt 7 to beyond the side edges of radially inner belt ply 7a, and a center binding band layer 8b arranged centrally on binding band layer 8a and running symmetrically to the equator plane of the tire and also extending about the tire circumference. The center binding band layer 8b extends over 10% to 80%, in particular at least 50%, of the width of binding band layer 8a.

Figure 2:
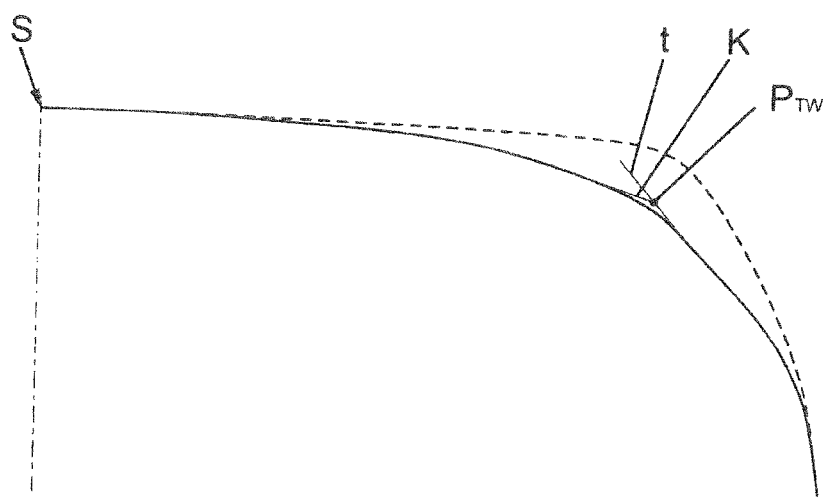
FIG. 2 shows, in cross-section, the tread contour of a tire half for determining the point $P_{TW}$.

The tread width TW 45 is slightly larger than the width of the tire impression on the ground if the tire is mounted on a rim and put under pressure. Width TW 45 is the mutual distance between two points $P_{TW}$. The position of the two points is determined as follows. Points $P_{TW}$ lie, as FIG. 2 shows, in each case at the point of intersection of a tangent t to the tire shoulder running at 45 degrees to the radial direction with a flat curve K which is the extension of the outer contour of the tread beyond the lateral edge of the width of the ground contact area.

Figure 3:
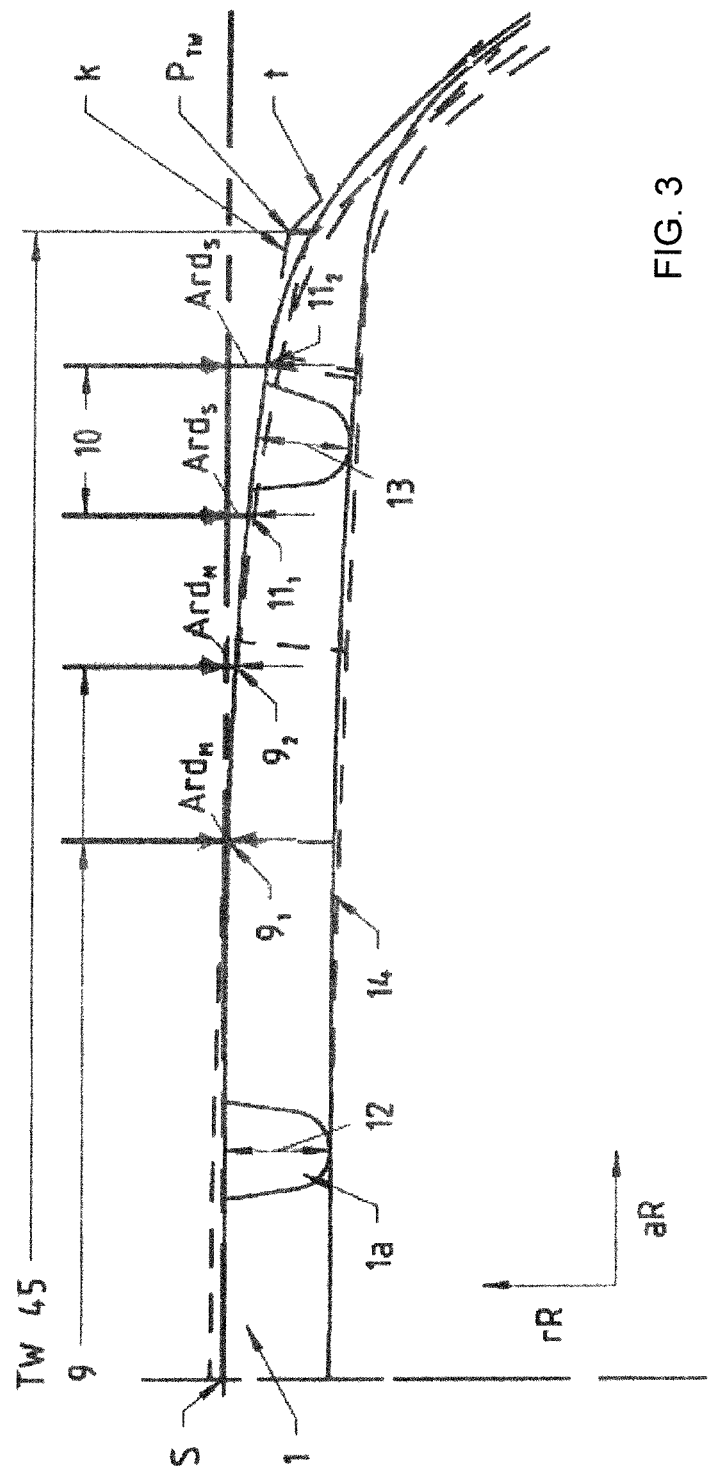
FIG. 3 shows a cross-sectional half through the tread of a tire according to the invention (continuous line) in comparison to the tire of the prior art (dashed line)

FIG. 3 shows a cross-sectional half through tread 1 of the tire according to the invention (continuous line) in comparison with a tire of the prior art (dashed line).

For the sake of clarity, no reference numbers are entered in the corresponding cross-sectional half of the tread in the case of the tire of the prior art.

The upper line shows the outer contour of the tread, while the lower line shows lower contour path 14.

The tire according to the invention of radial configuration differs from the tire of the prior art shown in FIGS. 1 and 2 which is represented here by the dashed line in that maximum depth 12 of tread grooves 1a is identical within center region 9 of TW 45 and is 7.8 mm. Maximum depth 13 of grooves 1a in shoulder region 10 is a maximum of 2 mm less than in center region 9 and is 6.6 mm. The outer contour of tread 1 in the center region 9 is configured to be flat such that outer contour radius difference $Ard_M$ between zenith S and the axial end of center region 9, which lies between points $9_1$ and $9_2$, is less than 1 mm. The axial end of the center region lies here at point $9_1$ and outer contour radius difference $Ard_M$ is 0.1 mm. The outer contour of tread 1 in the region of the transition to the shoulder region, which lies between points $11_1$ and $11_2$, is so configured that the outer contour radius difference $Ard_S$ between zenith S and this transition to the shoulder region is 3 mm to 5 mm. The transition to the shoulder region lies here at point $11_1$ and the outer contour radius difference is 3 mm here.

Center region 9 extends from zenith S axially to the outside up to a specific point, which lies in a region between points $9_1$ and $9_2$, wherein point $9_1$ corresponds to an axial width of 0.4×TW 45 (40%) and point $9_2$ corresponds to an axial width of 0.6×TW 45 (60%).

The transition to the shoulder region begins, coming from zenith S, starting from a specific point, which lies in a region between points $11_1$ and $11_2$. The point $11_1$ corresponds to an axial width of 0.8×TW 45 (80%) and point $11_2$ corresponds to an axial width of 0.9×TW 45 (90%).

Figure 4B:
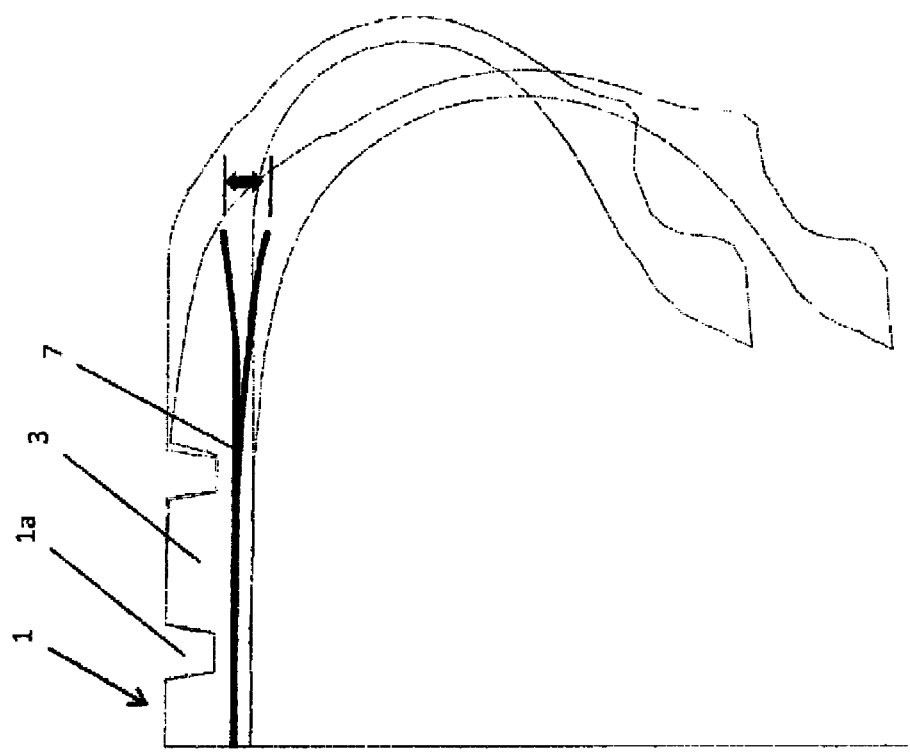
FIG. 4A shows a cross-sectional half of a tire of the prior art in the normal state and in the operational state; and, FIG. 4B shows a cross-sectional half of a tire according to the invention in the normal state and in the operational state.
Figure 4A:
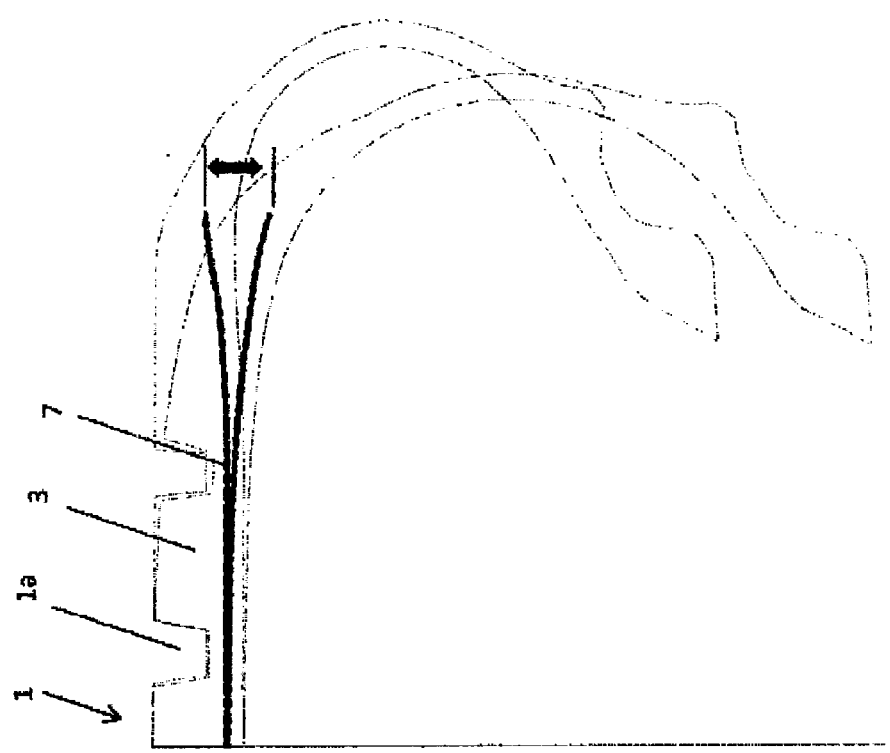

FIG. 4A shows a cross-sectional half of a tire of the prior art in the normal state and in the operational state; whereas, FIG. 4B shows a cross-sectional half of a tire according to the invention in the normal state and in the operational state. It becomes clear that, in the case of the tire according to the invention, the deformation in the region of the belt edge and the tread thereabove is significantly smaller than in the case of the tire of the prior art. The pneumatic vehicle tire according to the invention of FIG. 4B is described in FIG.

3. The conflict of objectives between transverse rigidity, rolling resistance and wear is resolved at a higher level in the case of the tire according to the invention.

The following table shows a comparison of reference tire $R_R$ with tire $R_E$ embodied according to the invention. Both pneumatic vehicle tires $R_R$ and $R_E$ are summer car tires of the dimension 205/55 R 16 with identical profiling.

Reference tire $R_R$ has, within the center region of TW 45, grooves with unequal maximum depths between 8.8 mm and 8.2 mm and the maximum depth of the grooves in the shoulder region is 3 mm less than in the center region. The outer contour of the tread in the center region is furthermore configured to be round in contrast to the tire according to the invention so that the outer contour radius difference between the zenith and the axial end of the center region is 0.6 mm. The outer contour of the tread in the region of the transition to the shoulder region is configured such that the outer contour radius difference between the zenith and this transition to the shoulder region is 8 mm.

In the case of tires according to the invention, the maximum depth of the tread grooves within the center region of TW 45 is identical and is 7.8 mm. The maximum depth of the grooves in the shoulder region is a maximum of 2 mm less than in the center region and is 6.6 mm. The outer contour of the tread in the center region is configured to be flat such that the outer contour radius difference between the zenith and the axial end of the center region is less than 1 mm, namely 0.1 mm. The outer contour of the tread is configured in the region of the transition to the shoulder region such that the outer contour radius difference between the zenith and this transition to the shoulder region is 3 mm.

Tire $R_E$ according to the invention has a rolling resistance which is improved by 4% in comparison to reference tire $R_R$. The transverse rigidity of tire $R_E$ according to the invention is improved by 4% in comparison to reference tire $R_R$. Tire $R_E$ according to the invention has abrasion improved by 15% in comparison to reference tire $R_R$.

TABLE

|  | Reference tire $R_R$ [%] | Tire $R_E$ according to the invention [%] |
| --- | --- | --- |
| Transverse rigidity determined according to P-CRCS | 100 | 104 |
| Abrasion determined according to P-ABR | 100 | 115 |
| Rolling resistance determined according to P-RRI28 | 100 | 104 |

It is understood that the foregoing description is that of the preferred embodiments of the invention and that various changes and modifications may be made thereto without departing from the spirit and scope of the invention as defined in the appended claims.

LIST OF REFERENCE NUMBERS

1 Tread
1a Circumferential groove
2 Radial carcass
3 Profile positive
4 Bead core
5 Side wall
6 Core profile
7 Belt
7a Belt ply
7b Belt ply
8 Belt binding band
8a Belt binding band layer
8b Belt binding band layer
9 Center region
$9_1$ Center region end axially inside
$9_2$ Center region end axially outside
10 Shoulder region
11 Transition shoulder region
$11_1$ Transition shoulder region axially inside
$11_2$ Transition shoulder region axially outside
12 Grooves of maximum depth in the center region
13 Grooves of maximum depth shoulder region
14 Lower contour path
$Ard_M$ Outer contour radius difference zenith to center region
$Ard_S$ Outer contour radius difference zenith to shoulder region
S Zenith
t Tangent
K Curve

What is claimed is:

1. A pneumatic vehicle tire having a radial configuration and defining a zenith (S), the tire comprising:
a belt having at least two plies;
a tread having an axial width of TW 45 and a plurality of profile grooves arranged within said axial width of TW 45 defining profile positives;
said profile grooves having respective maximum depths which vary within said axial width of TW 45;
said tread including a center region having an axial end at an axial extension of 40% to 60% of said axial width, a shoulder region extending axially from 80% to 90% of said axial width, and a transition point arranged within said shoulder region;
said tread further having an outer contour defined on the basis of outer contour radial differences when said tire is mounted and inflated;
said outer contour radial differences including a first outer contour radius difference ($Ard_M$) between the zenith (S) and said axial end of said center region and a second outer contour radius difference ($Ard_s$) between the zenith (S) and said transition point;
said profile grooves including a first subset of profile grooves arranged within said center region and a second subset of profile grooves arranged within said shoulder region;
the grooves of said first subset having equal first maximum depths;
the profile grooves of said second subset having maximum depths which are at most 2 mm less than said first maximum depths;
said outer contour of said tread being configured flat in said center region so as to cause said first outer radius difference ($Ard_M$) to be approximately 0.3 mm; and,
said outer contour of said tread being further configured so as to cause said second outer radius difference ($Ard_s$) to lie in the range of 3 mm to 5 mm at said transition point.

2. The pneumatic vehicle tire of claim 1 further comprising a belt binding band arranged between said belt and said tread.

3. The pneumatic vehicle tire of claim 2, wherein said belt binding band is configured as a single ply belt binding band.

4. The pneumatic vehicle tire of claim 1, wherein said belt is configured as a two-ply belt having a plurality of reinforcement members in each ply, said reinforcement members defining a belt angle of less than 24° measured in the zenith (S) of said tire.

* * * * *